US005133380A

United States Patent [19]

[11] Patent Number: 5,133,380

Jamieson, III et al.

[45] Date of Patent: Jul. 28, 1992

[54] PNEUMATIC CONTROL VALVE

[75] Inventors: Hugh V. Jamieson, III, Lathrup Village; Endre A. Mayer; Robert D. Kachman, both of Troy; Matthew E. Green, Waterford, all of Mich.

[73] Assignee: Schenck Pegasus Corp., Troy, Mich.

[21] Appl. No.: 710,583

[22] Filed: Jun. 5, 1991

[51] Int. Cl.[5] .......... G05D 16/20

[52] U.S. Cl. .......... 137/83; 91/3; 137/625.65

[58] Field of Search .......... 137/83, 625.65; 91/3; 137/625.21, 625.22; 251/205

[56] References Cited

U.S. PATENT DOCUMENTS 35,068 4/1862 Allen .
54,163 4/1866 Homan .
195,005 9/1877 Hammond .
453,800 6/1891 Watkeys .
2,386,051 10/1945 Kempton .......... 251/205
2,448,649 9/1948 Adams .......... 251/205 X
2,577,999 12/1951 Christensen .
2,708,909 3/1954 Curlettt .
2,964,060 12/1960 Sargent .......... 136/625.2
3,104,659 10/1960 Smith .
3,580,287 5/1971 McLaughlin .
3,742,982 7/1973 Miller .
4,457,341 7/1984 Aspinwall .
5,012,836 5/1991 Jacobsen .......... 137/83

*Primary Examiner*—Alan Cohan
*Attorney, Agent, or Firm*—Reising, Ethington, Barnard, Perry & Milton

[57] ABSTRACT

A pneumatic control valve (10) including a valve body (12) with fixed aperture plate (14), a movable redirector (18) and a force motor (26). The force motor (26) supports the redirector (18) adjacent to the aperture surface (16) of the fixed aperture plate (14) and is operable to move the redirector (18) back and forth along a line (28) without contacting the aperture surface. The aperture surface (16) has a plurality of apertures (70,72,74,76,78) with metering edges (124,126,128,130,132,134,136,138). The redirector (18) has redirector cavities (102,104,106,108) with metering edges (140,142,144,146). The force motor (26) deflects the redirector (18) to positions in which one or more of the cavities in the redirector connect two or more of the apertures (70,72,74,76,78) and direct fluid from some apertures and into other apertures. The location, length and shape of the metering edges can be varied as required to obtain desired fluid flow characteristics.

14 Claims, 5 Drawing Sheets

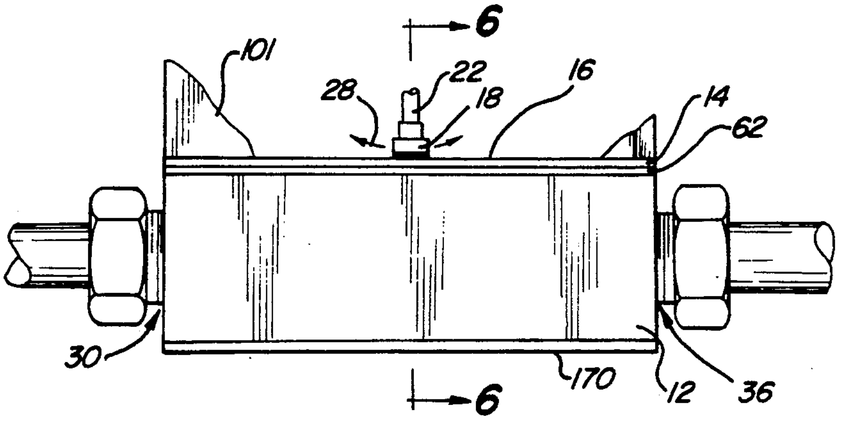
Fig-5
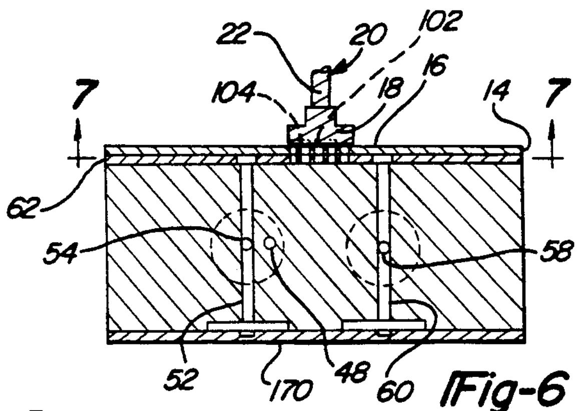
Fig-6
Fig-7
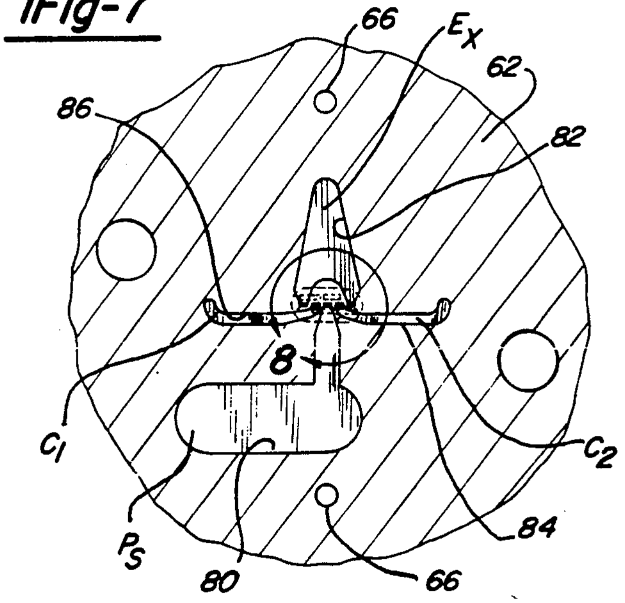
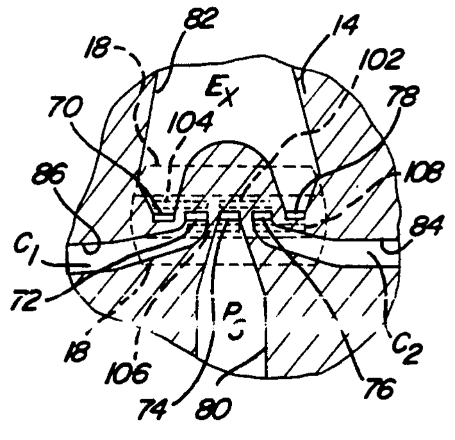
Fig-8

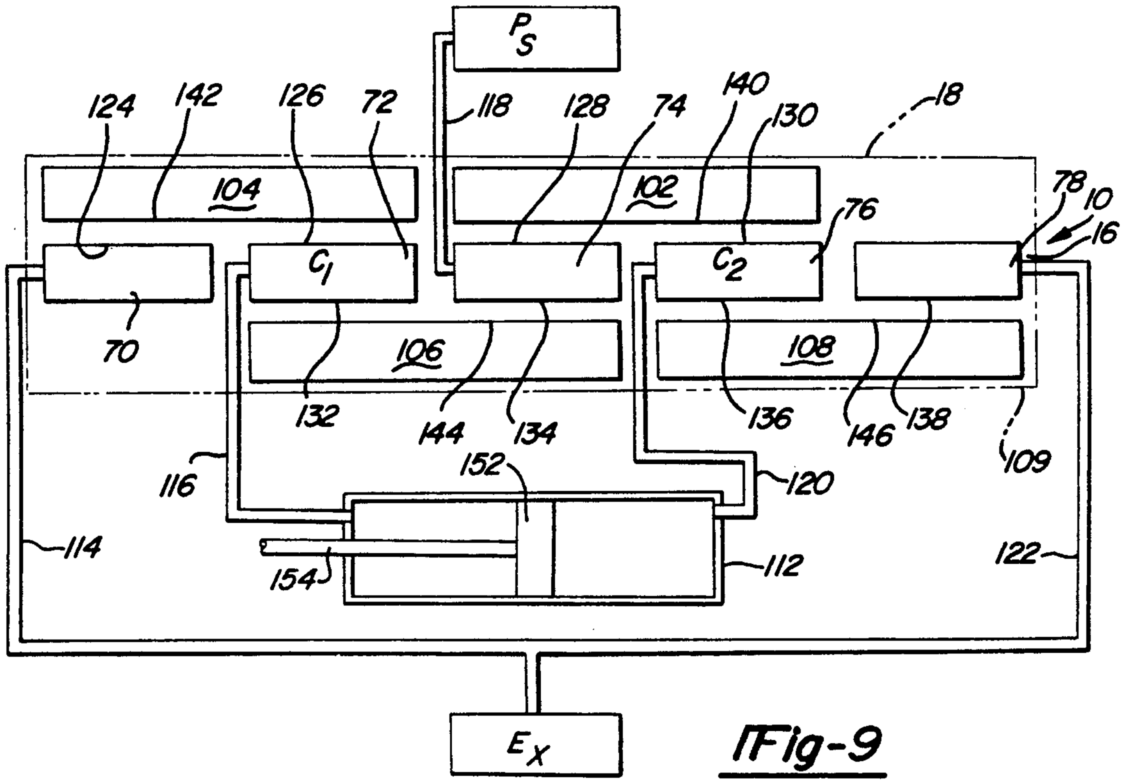
IFig-9
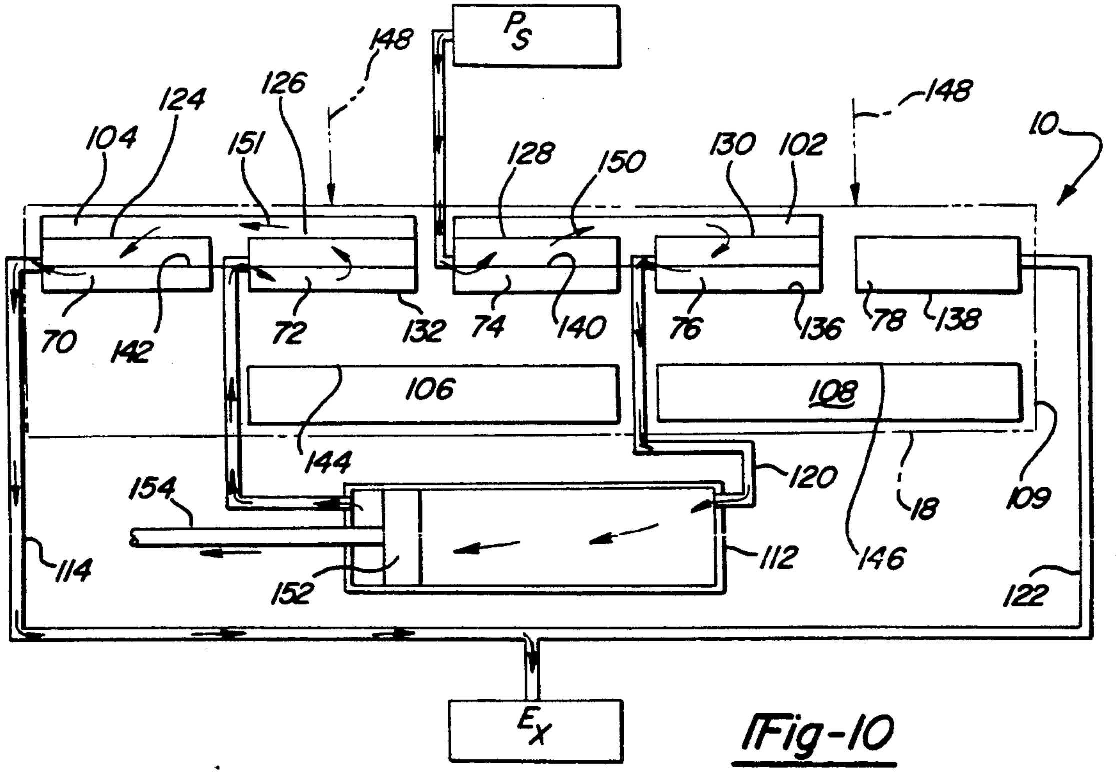
IFig-10

PNEUMATIC CONTROL VALVE

TECHNICAL FIELD

The invention relates to fluid control valves for accurately controlling the rate of movement and the direction of movement of fluid actuators and for pressure control.

BACKGROUND OF THE INVENTION

Hydraulic spool valves have been developed which can accurately control various types of hydraulic actuators. Some of these spool valves accurately control the rate of movement as well as the duration of movement. Unfortunately hydraulic control systems have a number of characteristics which are undesirable for some uses.

Hydraulic systems are relatively heavy. The actuators are heavy and large. Expensive seals and strong pipes are required to contain the hydraulic fluid and to prevent leaks. Spool valves are expensive to manufacture. The systems also generate heat and may require cooling. Cooling systems are frequently noisy. Hydraulic pumps, valves, actuators and pipes also produce noise. The noise levels can be objectionable and are difficult to control. Flow losses and pressure drops during flow are additional problems associated with hydraulic systems.

Pneumatic systems have some of the same problems that hydraulic systems have and also have some problems that are unique to pneumatic systems. The compressors for pneumatic systems generate heat and noise. However, it is relatively easy to pipe compressed gas substantial distances with minimal losses thereby isolating heat and noise generated by the compressor. The piping and actuators in a pneumatic system can be relatively light weight and inexpensive. Some leakage can generally be tolerated if the leaks do not generate excessive noise.

Lubrication of valves, actuators and other components of pneumatic control systems can be a substantial problem. Spool type valves generally do not work well in pneumatic systems due to the lack of lubrication and cleaning that occurs in a hydraulic system. Condensation of water from compressed gas may also be a serious problem. Deposits of dirt and other solid material mixed with a compressed gas can cause valves to stick. Lubrication and filtration equipment can be employed with pneumatic control systems to reduce but no eliminate problems due to contamination and friction. Pneumatic systems are generally very responsive due in part to the low inertia of the gas. Pressure drops in a pneumatic system are negligible unless there are large leaks or high flow rates.

SUMMARY OF THE INVENTION

A primary object of the invention is to provide a fluid control valve without contact between moving surfaces.

Another object of the invention is to provide a fluid control valve with relatively low infinitely variable flow rates and low internal leakage.

A further object of the invention is to provide a fluid control valve that is capable of precise accurate control of flow volume and pressure.

A still further object of the invention is to provide a pneumatic control valve which can be easily modified to accommodate changes in the volume of a fluid due to expansion with decreased pressure.

The fluid control valve of this invention includes a fixed valve body with a control aperture surface. The control aperture surface, in one form of the invention, includes five control apertures. The number of apertures can be increased or decreased as required by the functions to be controlled. The valve body has passages which connect the apertures in the control aperture surface to appropriate threaded port connectors.

The five apertures include a supply aperture, two control apertures and two exhaust apertures. The two control apertures, the supply aperture and the first exhaust aperture each have a first metering edge that is parallel to a first plane. The two control apertures and the supply aperture each have a second straight metering edge and the second exhaust aperture has a straight metering edge all of which are parallel to a second plane. The first and second planes are parallel to each other and spaced apart.

A movable redirector is supported, adjacent to and spaced from the aperture surface, by a movable redirector support assembly. The movable redirector support assembly is generally rigid in a direction perpendicular to the aperture surface and will allow movement of the movable redirector back and forth along a generally straight line that is perpendicular to the first and second planes. A force motor is connected to the movable redirector assembly to move the movable redirector back and forth along a generally straight line.

Four redirector cavities are provided in the movable redirector. Each cavity includes a metering edge. The force motor is operable to move or deflect the movable redirector support assembly in one direction to positions in which the metering edge of the first redirector cavity cooperates with the first metering edges of the supply aperture and the second control aperture to meter the flow of fluid between the supply aperture and the second control aperture and positions in which the straight metering edge of the second redirector cavity cooperates with the first metering edges of the first control aperture and the first exhaust aperture to meter the flow of fluid between the first exhaust aperture and the first control aperture. The force motor is also operable to move or deflect the movable redirector support assembly in a second direction to positions in which the straight metering edge of the third redirector cavity cooperates with the second straight metering edges of the supply aperture and the first control aperture to meter the flow of fluid between the supply aperture and the first control aperture and positions in which the metering edge of the fourth redirector cavity cooperates with the second metering edge of the second control aperture and the metering edge of the second exhaust aperture to meter the flow of fluid between the second control aperture and the second exhaust aperture.

The first metering edges of the first exhaust aperture, the first control aperture, the supply aperture and the second control aperture can all be located in the first plane. The second metering edges of the first control aperture, the supply aperture and the second control aperture and the metering edge of the second exhaust aperture can be located in the second plane. Location of the metering edges of the first and second redirector cavities in a plane parallel to the first plane will result in flow between the first exhaust aperture and the first control aperture starting at the same time as flow between the supply aperture and the second control aperture. Location of the metering edges of the third and fourth redirector cavities in a plane parallel to the second plane will result in flow between the first control aperture and the supply aperture starting at the same time as flow between the second control aperture and the second exhaust aperture. By changing the location of metering edges relative to the first and second planes, it is possible to vary valve lap. Unequal and non-zero valve lap varies the timing or start of flow through the apertures.

The length of the metering edges of the apertures can be changed as required to vary the area of each aperture. In some control systems it is desirable to vary the area of the apertures to accommodate the expansion of compressible fluids as the pressure decreases.

Fluid flow characteristics of the fluid valve can also be changed by changing the shape of the metering edges of the apertures in the fixed aperture plate and by changing the shape of the metering edges of the redirector cavities, or by changing the shape of the aperture and redirector cavity metering edges. Changing the shape of the metering edges allows the rate of change of flow rates to be changed without changing the rate of movement of the redirector.

Further objects, features and aspects of this invention will be understood from the following detailed description of the preferred embodiments of the invention with reference to the drawings.

DESCRIPTION OF THE DRAWINGS

FIG. 5 is an enlarged side elevation of the fluid control valve of FIG. 1 with portions of the force motor removed;

FIG. 6 is a sectional view taken along line 6—6 of FIG. 5;

FIG. 7 is an enlarged sectional view of the passage plate, the fixed aperture plate and the movable redirector taken along line 7—7 of FIG. 6;

FIG. 8 is an enlarged view of area 8 in FIG. 7;

FIG. 9 is a schematic view of a fluid system with the fluid control valve in a neutral position;

FIG. 10 is a schematic view of a fluid control system with the fluid control valve connecting the supply aperture to the second control aperture and connecting the first control aperture to the first exhaust aperture;

DESCRIPTION OF THE PREFERRED EMBODIMENTS

Figure 1:
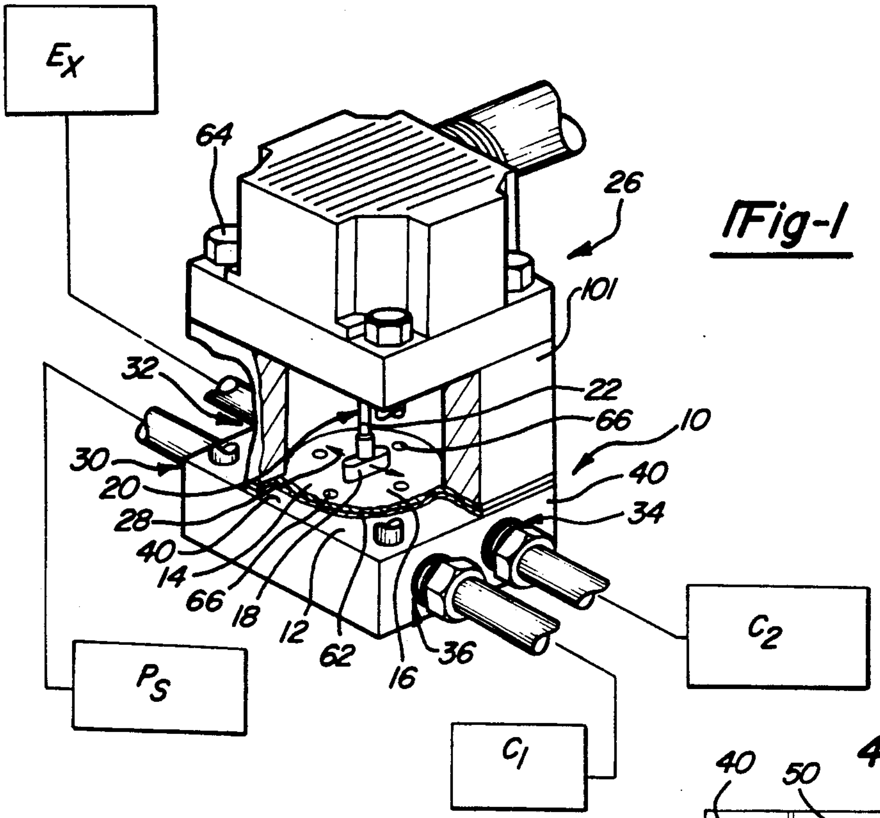
FIG. 1 is a perspective view of the fluid control valve with the force motor raised from the valve body and with a portion of the fixed spacer broken away.

The pneumatic control valve 10 as shown in FIG. 1 includes a valve body 12 and a fixed aperture plate 14 with an aperture surface 16. A movable redirector 18 is mounted adjacent the aperture surface 16 on a redirector support assembly 20. The redirector support assembly 20 includes a drive arm 22 and a torque arm 24. A force motor 26 is provided to deflect the torque arm 24 to move the movable redirector 18 back and forth along a line 28.

Figure 2:
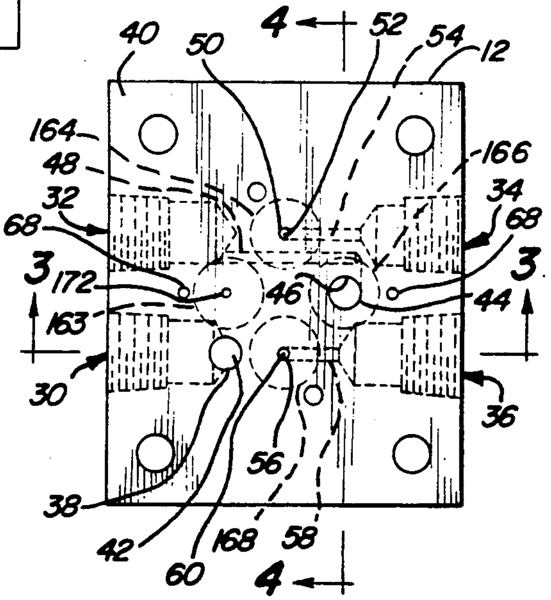
FIG. 2 is an enlarged view of the valve body of FIG. 1 with the fixed aperture plate that includes the aperture surface and the apertures and with the passage plate, which connects bores in the valve body to apertures in the fixed aperture plate, removed.
Figure 3:
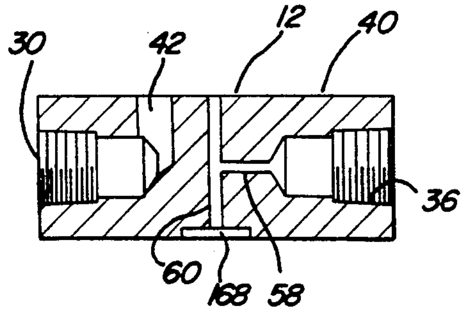
FIG. 3 is a sectional view of the valve body taken along the line 3—3 in FIG. 2.
Figure 4:
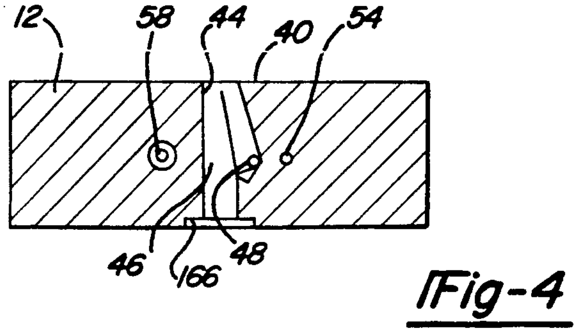
FIG. 4 is a sectional view of the valve body taken along the line 4—4 in FIG. 2.

The valve body 12 has threaded openings 30, 32, 34 and 36 for the connection of conduits connected to a supply source $P_S$ and exhaust $E_X$ and control $C_2$ and a control $C_1$, respectively. The threaded opening 30 in the valve body 12 is connected to a supply port 38 in the upper surface 40 of the valve body 12 by bore 42 shown in FIGS. 2 and 3. The threaded opening 32 is connected to an exhaust port 44 in the upper surface 40 of the valve body 12 by bores 46 and 48 shown in FIGS. 2 and 4. The threaded opening 34 is connected to a control port 50 in the upper surface 40 of the valve body 12 by bores 52 and 54 as shown in FIGS. 2, 4 and 6. The threaded opening 36 is connected to a control port 56 in the upper surface 40 of the valve body 12 by bores 58 and 60.

A passage plate 62 is secured between upper surface 40 of the valve body 12 and the fixed aperture plate 14 by bolts 64. Both the passage plate 62 and the fixed aperture plate 14 are aligned by two locating pins 66 that are pressed into bores 68 in the valve body 12. The fixed aperture plate 14, as shown in FIG. 8, includes a first exhaust aperture 70, a first control aperture 72, a supply aperture 74, a second control aperture 76 and a second exhaust aperture 78. The passage plate 62 includes a plurality of connecting passages which cooperate with the upper surface 40 of the valve body 12 and the fixed aperture plate 14 to form passages connecting the ports 38, 44, 50 and 56 in the valve body to the apertures 70, 72, 74, 76 and 78 in the fixed aperture plate 14. The supply port 38 is connected to the supply aperture 74 by a passage formed by a connecting passage 80 in passage plate 62. The exhaust port 44 is connected to the first exhaust aperture 70 and the second exhaust aperture 78 by a passage formed by a connecting passage 82. The control port 56 is connected to the first control aperture 72 by a passage formed by a connecting passage 86. The control port 50 is connected to the second control aperture 76 by a passage formed by connecting passage 84.

Figure 12:
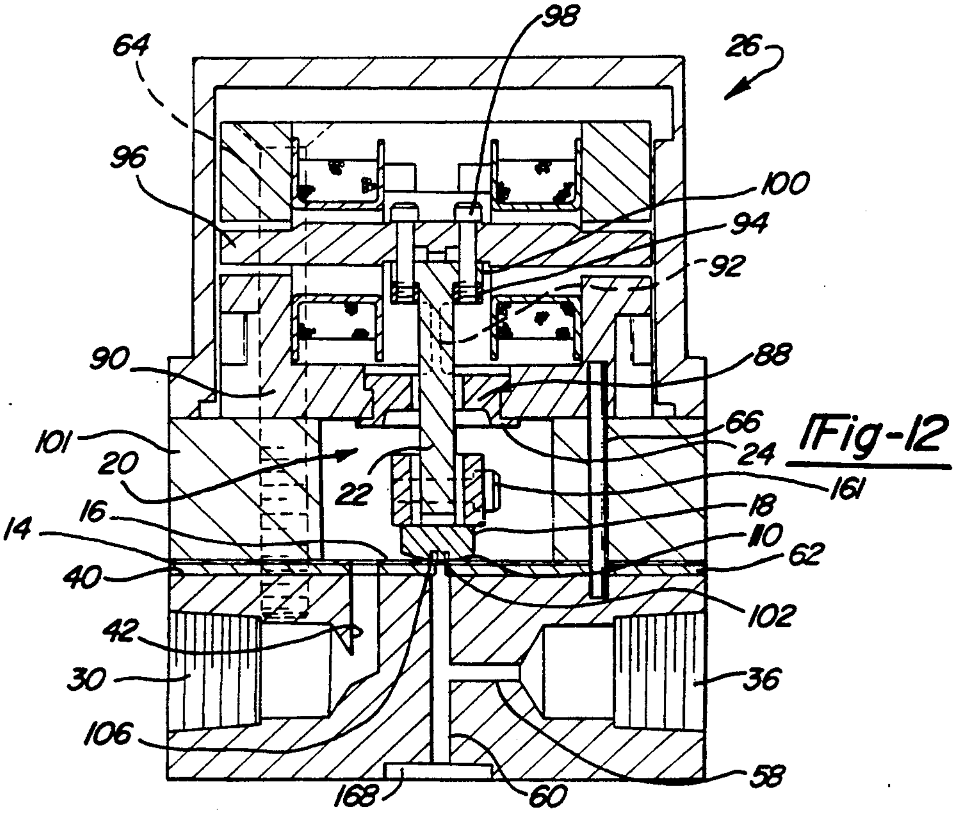
FIG. 12 is an enlarged cross-sectional view of the fluid control valve with the force motor attached.

The movable redirector 18 is supported directly adjacent to the aperture surface 16 of the fixed aperture plate 14 by a redirector support assembly 20 shown in FIG. 12. The redirector support assembly 20 includes a rigid drive arm 22 and a torque arm 24. The torque arm 24 is comprised of a lower flange 88, that is secured to the force motor lower pole piece 90, a pair of flexure members 92 and an upper flange 94 on its upper free end. An armature 96 of the force motor 26 is secured to the upper flange 94 on the torque arm 24 by bolts 98. A mounting flange 100, which is an integral part of the drive arm 22, is clamped between the armature 96 and the torque arm upper flange 94 by the bolts 98. When the force motor 26 is energized, the armature 96 exerts a force on the torque arm 24 which bends the flexure members 92, deflects the drive arm 22 and moves the movable redirector 18 along the line 28. Deflection of the drive arm 22 and the movable redirector 18 is proportional to the current supplied to the force motor 26. A change in the direction of current flow will change the direction of movement of the movable redirector 18. The force motor lower pole piece 90 is positioned on the valve body 12 by locating pins 66 and secured by bolts 64 shown in FIGS. 1 and 12.

A fixed spacer 101 is clamped between the lower pole piece 90 and the valve body 12 by the bolts 64. The fixed aperture plate 14 and the passage plate 62 are between the fixed spacer 101 and the upper surface 40 of the valve body 12. The bolts 64 which clamp the fixed spacer 101 to the valve body 12 also clamp the fixed aperture plate 14 and the passage plate 62 between the fixed spacer 101 and the valve body 12.

The movable redirector 18 includes a cavity surface 110, a first redirector cavity 102, a second redirector cavity 104, a third redirector cavity 106 and a fourth redirector cavity 108. The first and second redirector cavities 102 and 104 have metering edges 140 and 142 shown in FIGS. 9, 10 and 11 that are parallel to a first plane. The third and fourth redirector cavities 106 and 108 have metering edges 144 and 146 that are parallel to a second plane. The first and second planes are defined below.

Figure 11:
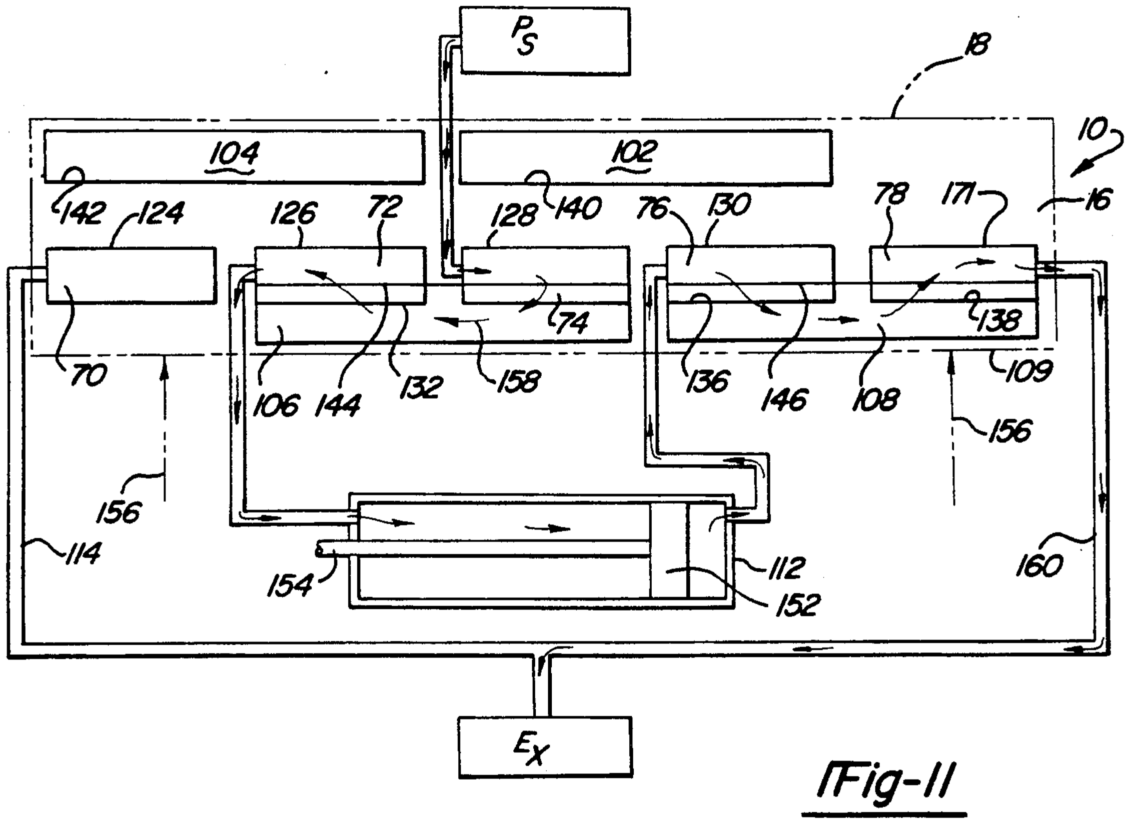
FIG. 11 is a schematic view of a fluid control system with the fluid control valve connecting the supply aperture to the first control aperture and connecting the second control aperture to the second exhaust aperture.

Operation of the control valve 10 is best understood by reference to FIGS. 9, 10 and 11. All three Figures disclose a supply $P_S$ for compressed fluid, an exhaust $E_X$ for receiving discharged fluid, a fluid actuator 112 and a pneumatic control valve 10. The movable redirector 18 with redirector cavities 102, 104, 106 and 108 is indicated by the broken line 109.

The pneumatic control valve 10 includes a aperture surface 16 with a first exhaust aperture 70, a first control aperture 72, a supply aperture 74, a second control aperture 76 and a second exhaust aperture 78. The first exhaust aperture 70 is connected to the exhaust $E_X$ by a conduit 114. The first control aperture 72 is connected to the rod end of a fluid actuator 112 by conduit 116. The supply aperture 74 is connected to the supply $P_S$ by a conduit 118. The second control aperture 76 is connected to the head end of a fluid actuator 112 by a conduit 120. The second exhaust aperture 78 is connected to the exhaust $E_X$ by a conduit 122.

The first exhaust aperture 70, the first control aperture 72, the supply aperture 74 and the second control aperture 76 have first metering edges 124, 126, 128 and 130. All four of the first metering edges are in a common first plane perpendicular to the aperture surface 16 as shown in FIGS. 9, 10 and 11. The first control aperture 72, the supply aperture 74, and the second control aperture 76 have second metering edges 132, 134 and 136. The second exhaust aperture 78 has a metering edge 138. The second metering edges 132, 134 and 136 and the metering edge 138 of the second exhaust aperture 78 are all in a common second plane that is perpendicular to the aperture surface 16 and is parallel to and spaced from the first plane.

Movement of the movable redirector 18 in a direction represented by arrows 148 in FIG. 10 will place the first redirector cavity 102 over the supply aperture 74 and the second control aperture 76. The metering edge 140 of the first redirector cavity 102 cooperates with the first metering edges 128 and 130 of the supply aperture 74 and the second control aperture 76 to meter the flow of fluid from the supply $P_S$, through the supply aperture 74, into the first redirector cavity 102, through the second control aperture 76 and into the head end of the actuator 112 as shown by the arrows 150. The second redirector cavity 104 is over the first control aperture 72 and the first exhaust aperture 70. The metering edge 142 of the second redirector cavity 104 cooperates with the first metering edges 124 and 126 of the first control aperture 72 and the first exhaust aperture 70 to meter the flow of fluid from the rod end of the actuator 112, through the first control aperture 72, into the second redirector cavity 104, through the first exhaust aperture 70 and to the exhaust $E_X$ as shown by the arrows 151. The piston 152 and the piston rod 154 of the fluid actuator 112 move to the left as shown in FIG. 10.

Movement of the movable redirector 18 in a direction represented by the arrows 156 in FIG. 11 will place the third redirector cavity 106 over the first control aperture 72 and the supply aperture 74. The metering edge 144 of the third redirector cavity 106 cooperates with the second aperture metering edges 132 and 134 of the first control aperture 72 and the supply aperture 74 to meter the flow of fluid from the supply $P_S$ through the supply aperture 74, into the third redirector cavity 106, through the first control aperture 72 and into the rod end of the actuator 112 as shown by the arrows 158. The fourth redirector cavity 108 is over the second control aperture 76 and the second exhaust aperture 78. The metering edge 146 of the fourth redirector cavity 108 cooperates with the second metering edge 136 of the second control aperture 76 and the metering edge 138 of the second exhaust aperture 78 to meter the flow of fluid from the piston end of the actuator 112, through the second control aperture 76, into the fourth redirector cavity 108, through the second exhaust aperture 78 and to the exhaust $E_X$ as shown by the arrows 171. The piston 152 and the piston rod 154 of the fluid actuator 112 move to the right as shown in FIG. 11.

The fluid actuator 112 as shown in FIGS. 9, 10 and 11 is a linear actuator with a cylinder and piston 152. It could be a rotary actuator or most any other device operated by fluid under pressure or a vacuum. The actuator can perform the desired work or it can merely control another actuator.

Figure 13:
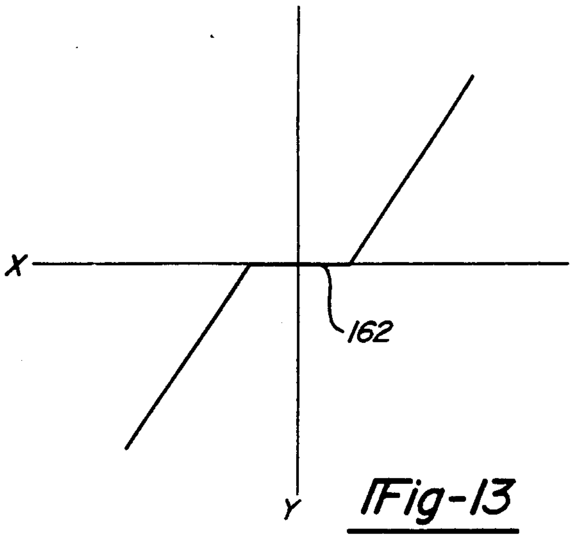
FIG. 13 is a graph showing the theoretical fluid flow rate for a valve having overlapped metering edges with metering edges in various positions.

The pneumatic control valve 10 is in an off or no flow position as shown in FIG. 9. The space between the first metering edge 124 of the first exhaust port 70 and the metering edge 142 of the second redirector cavity 104 is the valve lap. As shown in FIG. 10 the lap is an over lap and is uniform for all metering edges of the apertures and redirector cavities. The graph in FIG. 13, with the X-axis representing redirector position and the Y-axis representing fluid flow, is the expected flow that would occur with the over lap shown in FIG. 9 assuming no leakage and assuming that the metering edges for the apertures and redirector cavities are parallel straight lines as shown in FIGS. 9, 10 and 11. The redirector position is proportional to current in the force motor. The X-axis therefore also represents current to the force motor 26.

Elimination of the over lap shown in FIG. 9 would place the metering edges of the redirector cavities in the first and second planes with the metering edges of the apertures in the aperture surface 16. This zero lap condition would eliminate the horizontal portion 162 of the curve shown in FIG. 13. Some leakage normally occurs in valves with zero lap. To eliminate the horizontal portion 162 of the curve shown in FIG. 13, it is necessary to make adjustments in the lap due to leakage.

Figure 14:
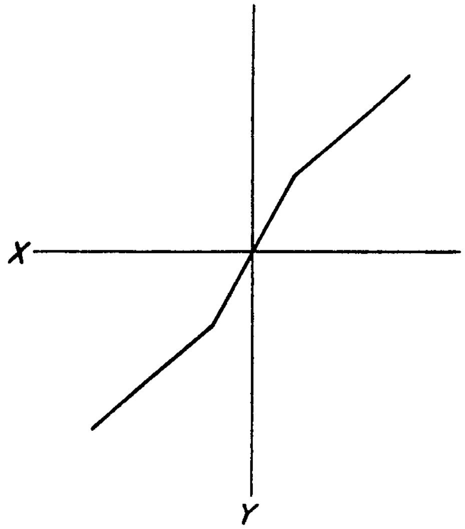
FIG. 14 is a graph showing the theoretical fluid flow rate for a valve having underlapped metering edges with metering edges in various positions.

An under lap condition between the metering edges of the apertures and the redirector cavities will permit some fluid flow or some pressure to be exerted when the valve is in neutral position. An underlapped valve can be very controllable in that all metering edges will change flow and/or pressure in response to any movement of the redirector. FIG. 14 is a graph indicating fluid flow on the Y-axis and redirector position on the X-axis in a valve with an under lap. The lap between different functions can be changed if desired to change the operating characteristics of an actuator 112. A decrease in the lap between the second redirector cavity 104, the first control aperture 72 and the first exhaust aperture 70, by moving the metering edge 142 closer to the first metering edge 124 and the first metering edge 126, will allow fluid to flow out of the rod end of the actuator 112 as shown in FIG. 10 before fluid starts to flow into the head end of the actuator 112. This adjustment in the lap known as edge timing, will change the response characteristics of the fluid actuator 112. All of the laps in the pneumatic control valve 10 can be easily changed to adjust the response characteristics of the fluid actuator 112 that are dependent on timing and lap. The laps can be changed by moving the metering edges of the apertures in the fixed aperture plate 14 or by moving the metering edges and the redirector cavities in the movable redirector 18.

Gases increase in volume with decreases in pressure. These increased volumes can be accommodated by changing the lengths of the metering edges of the apertures in the fixed aperture plate 14 and if necessary the lengths of the metering edges of the redirector cavities in the movable redirector. In a system in which the fluid expands to double its volume in the fluid actuator 112, it is desirable to double the length of the metering edges of the first and second exhaust apertures 70 and 78 and the first and second control apertures 72 and 76. The areas of the exhaust and control apertures could thereby be doubled so that the increased volume could be accommodated. The redirector cavities in the movable redirector 18 should be changed to cover the desired apertures in the fixed aperture plate 14 if change is required.

The changes in the valve lap and the length of the metering edges, as suggested above are easy to accommodate in the pneumatic control valve 10. Apertures can be cut in the desired locations and with the desired areas and dimensions in fixed aperture plates 14. One fixed aperture plate 14 can be substituted for another. Changing the movable redirector 18 is also easy. The movable redirector 18 can be removed from the drive arm 22 by releasing the clamping bolt 161 and a new movable redirector can be clamped to the drive arm. The redirector cavities can be connected by passages in the movable redirector 18 if desired.

The valve body 12 includes O-ring ports 163, 164, 166 and 168 in the bottom surface. In some installations the O-ring ports are used rather than the threaded openings 30, 32, 34 and 36. In these installations, the valve body 12 is bolted to a manifold with internal passages that connect to the O-ring ports. The O-ring port cover plate 170, shown in FIGS. 5 and 6 is removed, the valve body 12 is secured to a manifold and the threaded apertures 30, 32, 34 and 36 are plugged if the O-ring ports are utilized. The bore 172 then supplies fluid from the supply $P_S$ to the connecting passage 80 in the passage plate 62. If desired, bore 42 could be connected to the bore 172 by an internal passage in the valve body 12.

Figure 15A:
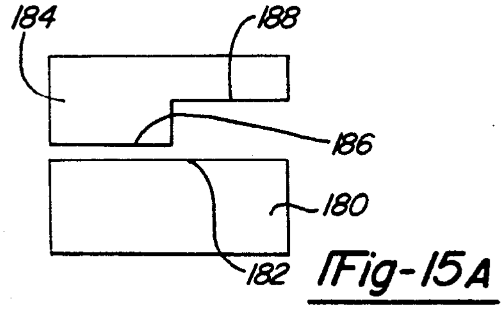
FIG. 15A is a schematic view of two fluid apertures with cooperating metering edges that have a specific shape.
Figure 15B:
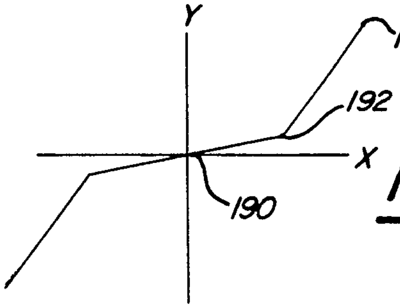
FIG. 15B is a graph depicting flow rates with the metering edges in FIG. 15A in various positions relative to each other from a no flow position to a maximum flow position.
Figure 16A:
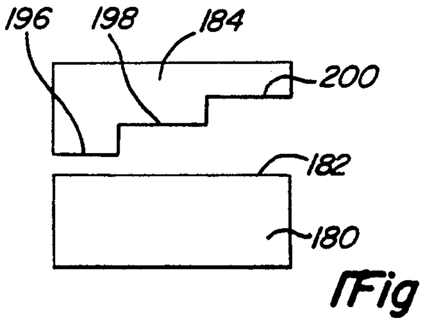
FIG. 16A is a schematic view of two fluid apertures with cooperating metering edges that have a specific shape.
Figure 16B:
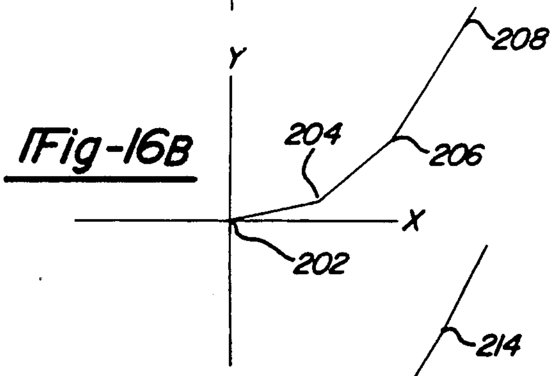
FIG. 16B a graph depicting flow rates with the metering edges in FIG. 16A in various positions relative to each other from a no flow position to a maximum flow position.
Figure 17A:
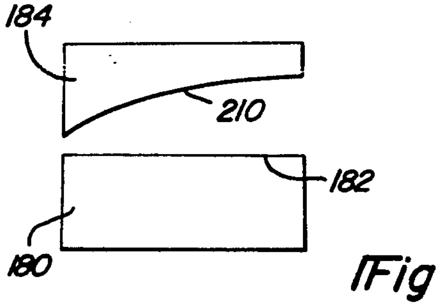
FIG. 17A is a schematic view of two fluid apertures with cooperating metering edges that have a specific shape.
Figure 17B:
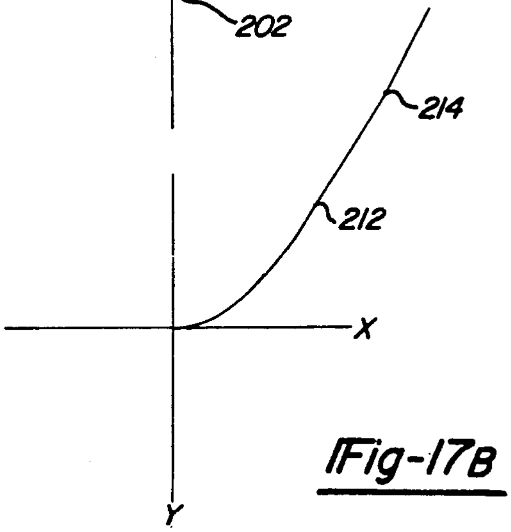
FIG. 17B is a graph depicting flow rates with the metering edges in FIG. 17A in various positions relative to each other from a no flow position to a maximum flow position.

The pneumatic control valve 10, as described above, can accommodate various valve laps and various metering edge lengths. The shape of one or both of any pair of metering edges in a fluid control valve can be changed from a straight line to other shapes to provide additional fluid flow and pressure characteristics. An infinite number of metering edge shapes are possible. FIGS. 15A, 16A and 17A each show apertures with one straight metering edge and a cooperating aperture with a metering edge that is a different shape. One of the apertures would be in the movable redirector 18 and the other would be in the fixed aperture plate described above. A graph showing the fluid flow that would be obtained, as one of the apertures is moved toward the other, is included in corresponding FIGS. 15B, 16B and 17B. Either of the apertures could be movable relative to the other. Both apertures could have metering edges which are a shape other than a straight line if desired. The graphs only depict positive flow through the ports. Obviously fluid could flow in either direction and the curves shown in the graphs could be moved by changing the valve lap.

FIG. 15A shows a first aperture 180 with a straight metering edge 182 and a second aperture 184 with metering edges 186 and 188. Upon movement of the apertures toward each other, the metering edges 182 and 184 will first cooperate with each other to control flow. Continued movement of one of the apertures 180 and 184 relative to the other results in flow increasing at a generally fixed rate. This flow rate is indicated by the graph in FIG. 15B between points 190 and 192. Further movement of one of the apertures 180 and 184 relative to the other aperture results in the metering edge 188 as well as the metering edge 186 cooperating with the straight metering edge 182 to meter fluid flow. The rate of increase of flow, with movement of the apertures 180 and 184 toward a maximum flow position, increases when the metering edge 188 starts to meter fluid. The flow rate with both metering edges 186 and 188 cooperating with straight metering edge 182 to meter fluid is indicated by the portion of the graph between point 192 and maximum flow at point 194.

FIG. 16A shows a first aperture 180 with a straight metering edge 182 and a second aperture 184 with metering edges 196, 198 and 200. The accompanying graph in FIG. 16B has a section from point 202 to point 204 that represents flow when metering edge 196 cooperates with straight metering edge 182 to control flow. The section of the graph from point 204 to point 206 represents flow when metering edges 196 and 198 cooperate with metering edges 182 to control flow. The section of the graph from point 206 to point 208 represents flow when metering edges 196, 198 and 200 cooperate with straight metering edge 182 to control flow.

FIG. 17A shows a first aperture 180 with a straight metering edge 182 and a second aperture 184 with a curved metering edge 210. The accompanying graph has a curve 212 that indicates flow rates that result from displacement of one of the apertures 180 and 184 relative to the other. The curved metering edge 210 cooperates with straight metering edge 182 to increase flow with movement of the apertures toward the full flow position at an increasing rate until the metering edge 182 has moved past the curved metering edge 210 along the entire length of one of the metering edges 182 and 210. Further movement of the apertures 180 and 184 toward a maximum flow position will increase flow at a fixed rate as shown by the straight portion of the curve 212 starting at point 214.

The valve lap can be changed to vary the start of flow. The length of the metering edges can be changed to vary the area of apertures and thereby change flow rates and the shape of one or both metering edges can be changed as required to vary the rate of change of flow rates.

The control valve 10 as designed can be manufactured in various sizes to accommodate a range of pressures and flow rates. The pneumatic control valve 10 could, for example, accommodate fluid pressures of one hundred fifteen pounds per square inch and flow rates of less than one cubic foot per minute. The fixed aperture plate 14 in such a system is a brass plate or a steel plate with apertures formed by a photochemical etching process or an electrical discharge machining process. The movable redirector 18 is positioned with its cavity surface 110 spaced from the aperture surface 16 of the fixed aperture plate 14 a distance of approximately 0.0005 of an inch. The space will result in leakage of about ten percent of the total maximum flow rate. The movable redirector 18 moves approximately 0.015 of an inch when the pneumatic control valve changes from off to full flow. To move 0.015 of an inch, the movable redirector 18 swings through an arc of approximately 0.88 degrees.

The pneumatic control valve 10 has been described assuming that fluid from the supply $P_S$ is pressurized and flows from the supply $P_S$ to the actuator 112 and on to the exhaust $E_X$. The supply $P_S$ could be a vacuum and flow could be in the opposite direction from that shown in FIGS. 10 and 11. It should also be recognized that the various apertures in the fixed aperture plate 14 can be rearranged as desired with appropriate changes in the passages in the valve body 12. In addition to rearranging the apertures in the fixed aperture plate 14, the number of apertures can be increased or decreased to provide the required control. The number, size and shape of the cavities or passages in the movable redirector 18 depends upon the number, size, shape and arrangement of the apertures in the fixed aperture plate and the desired valve flow and pressure characteristics.

The valve has been designed to operate with compressable fluids. However, it could also control liquids including oil. The features which prevent valve sticking with gasses will also prevent sticking when controlling liquid flow and pressure.

The invention has been described in detail in connection with preferred embodiments. It will be easily understood by those skilled in the art that various modifications can be made to the valve without departing from the scope of the invention.

We claim:

1. A pneumatic control valve including a fixed valve block with an aperture surface; at least four apertures in the apertured surface each of which includes at least one metering edge; a movable redirector supported adjacent to and spaced from the aperture surface; a movable redirector support assembly supporting the movable redirector, wherein the movable redirector support assembly is generally rigid in a direction perpendicular to the aperture surface and wherein the movable redirector support assembly is operable to allow movement of the movable redirector back and and forth generally parallel to the aperture surface; at least two redirector cavities in the movable redirector each of which has a metering edge that is perpendicular to the direction of movement of the movable redirector and wherein the metering edges of the apertures in the aperture surface of the fixed valve body are in a plurality of spaced apart parallel planes to vary the valve lap and to vary the start of flow through one port relative to the start of flow through another port; and deflection means, connected to the movable redirector support assembly, operable to position the movable redirection in a position in which one of the redirector cavities in the movable redirector connects at least two apertures in the aperture surface and a position in which the metering edges of the apertures in the aperture surface cooperates with the metering edge of one of the redirector cavities in the movable redirector to meter fluid from one aperture in the aperture surface, through the redirector cavity in the movable redirector and through a second aperture in the aperture surface.

2. The pneumatic control valve if claim 1 wherein the length of the metering edges of the apertures surface vary in length and the apertures vary in area to provide desired flow characteristics.

3. A pneumatic control valve including a fixed valve block with an aperture surface; a supply aperture in the aperture surface with a first straight metering edge in a first plane and a second straight metering edge in a second plane which is parallel to and spaced from the first plane; a first control aperture, in the aperture surface, spaced from the supply aperture and having a first straight metering edge that is parallel to the first plane and a second metering edge that is parallel to the second plane; a second control aperture in the aperture surface, spaced from the supply aperture and having a first straight metering edge that is parallel to the first plane and a second metering edge that is parallel to the second plane; a first exhaust aperture, in the aperture surface, spaced from the supply aperture and the first and second control apertures and having a first straight metering edge that is parallel to the first plane; a second exhaust aperture, in the aperture surface, spaced from the supply aperture, the first and second control apertures and the first exhaust aperture and having at least one straight metering edge that is parallel to the second plane; conduit connectors n the valve block that are each connected to at least one of the apertures in the aperture surface; a movable redirector supported adjacent to and spaced from the aperture surface; a movable redirector support assembly supporting the movable redirector, wherein the movable redirector support assembly is generally rigid in a direction perpendicular to the aperture surface and wherein the movable redirector support assembly is operable to allow movement of the movable redirector back and forth along a generally straight line that is perpendicular to the first plane; a first redirector cavity in the movable redirector with a straight metering edge that is parallel to the first plane, a second redirector cavity in the movable redirector with a straight metering edge that is parallel to the first plane; a third redirector cavity in the movable redirector with a straight metering edge that is parallel to the second plane; a forth redirector cavity in the movable redirector with a straight metering edge that is parallel to the second plane; and deflection means; connected to the movable redirector support assembly, operable to move the movable redirector to positions in which the straight metering edge of the second redirector cavity cooperates with the first straight metering edge of the first exhaust aperture and the first straight metering edge of the first control aperture to meter the flow of fluid between the first exhaust aperture and the first control aperture and in which the straight metering edge of the first redirector cavity cooperates with the first straight metering edge of the supply aperture and the first straight metering edge of the second control aperture to meter the flow of fluid between the supply aperture and the second control aperture; and wherein the deflection means is operable to move the movable redirector to positions in which the straight metering edge of the third redirector cavity cooperates with the second straight metering edge of the first control aperture and the second straight metering edge of the supply aperture to meter the flow of fluid between the supply aperture and the first control aperture and in which the straight metering edge of the forth redirector cavity cooperates with the second straight metering edge of the second control aperture and a straight metering edge of the second exhaust aperture to meter the flow of fluid between the second control aperture and the second exhaust aperture.

4. The pneumatic control valve of claim 3 wherein the first straight metering edge of the first exhaust aperture, the first straight metering edge of the first control aperture, the first straight metering edge of the supply aperture and the first straight metering edge of the second control aperture are in the first plane and wherein the second straight metering edge of the first control aperture, the second straight metering edge of the supply aperture, the second straight metering edge of the second control aperture and a straight metering edge of the second exhaust aperture are in the second plane.

5. The pneumatic control valve of claim 3 wherein the first metering edge of the first exhaust aperture, the first metering edge of the first control aperture, the first metering edge of the supply aperture and the first metering edge of the second control aperture are in at least two different planes to thereby vary the valve lap and to vary the start of flow through one aperture relative to the start of flow through another aperture.

6. The pneumatic control valve of claim 3 wherein the length of the straight metering edges of the apertures in the aperture surface vary in length and the apertures vary in area to provide desired flow characteristics.

7. A fluid control valve including an aperture plate with a center line, at least three apertures, each of which has at least one fluid metering edge and at least one of which has two metering edges, in the aperture plate that are spaced from each other and positioned along the center line; a movable redirector supported adjacent to and spaced from the aperture plate; a movable redirector support assembly supporting the movable redirector; deflection means, attached to the movable redirector support assembly, operable to move the movable redirector along a line generally perpendicular to the center line of the aperture plate; at least first and second redirector cavities in the redirector, each of which has a metering edge and wherein the first redirector cavity has a metering edge that cooperates with the metering edges of at least two apertures in the aperture plate to meter the flow of fluid through at least two apertures in the aperture plate when the deflector means moves the redirector in one direction and wherein the second redirector cavity has a metering edge that cooperates with the metering edges of at least two apertures in the aperture plate to meter the flow of fluid through at least two apertures in the aperture plate when the deflector means moves the redirector in another direction and wherein at least one of the metering edges is shaped to vary the rate of change of fluid flow relative to movement of the redirector.

8. The fluid control valve of claim 7 wherein the redirector cavity connects at least two of the apertures in the aperture plate and directs the flow of fluid from one aperture in the aperture plate to a second aperture in the aperture plate.

9. The fluid control valve of claim 7 wherein at least one of the metering edges is a curve.

10. The fluid control valve of claim 7 wherein at least one of the metering edges includes a plurality of steps.

11. The fluid control valve of claim 7 wherein an aperture in the aperture plate is formed by a photochemical etching process.

12. The fluid control valve of claim 7 wherein an aperture in the aperture plate is formed by an electrical discharge machining process.

13. A fluid control valve including an aperture plate with a center line, at least three apertures, each of which has at least one fluid metering edge and at least one of which has two metering edges, in the aperture plate that are spaced from each other and positioned along the center line; a movable redirector supported adjacent to and spaced from the aperture plate; a movable redirector support assembly supporting the movable redirector; at least two redirector cavities with metering edges in the redirector; and deflection means attached to the movable redirector support assembly and operable to move the movable redirector in a first direction from a position in which the redirector cavities are out of communication with all apertures in the aperture plate to a position in which one of the redirector cavities is in communication with at least two apertures in the aperture plate so that the metering edge of said one of the redirector cavities cooperates with the metering edges of at least two of the apertures to meter the flow of fluid through the two apertures, and is operable to move the movable redirector in a second direction from a position in which the redirector cavities are out of communication with all apertures in the aperture plate to a position in which another of the redirector cavities is in communication with at lest two apertures in the aperture plate so that the metering edge is said another of the redirector cavities cooperates with the metering edges of at least two of the apertures to meter the flow of fluid through the two apertures.

14. A pneumatic control valve including a fixed valve body with an aperture surface; at least three apertures in the aperture surface each of which includes a metering edge and at least one of which has two metering edges; a movable redirector support adjacent to and spaced from the aperture surface; a movable redirector support assembly supporting the movable redirector wherein the movable redirector support assembly is generally rigid in a direction perpendicular to the aperture surface and wherein the movable redirector support assembly is operable to allow movement of the movable redirector back and forth generally parallel to the aperture surface at least first and second redirector cavities in the movable redirector with metering edges that are in spaced apart planes which are generally perpendicular to the direction of movement of the movable redirector; and deflector means connected to the movable redirector support assembly operable to move the redirector in a first direction to positions in which the metering edge of one of the redirector cavities cooperates with the metering edges of at least two of said at least three apertures in the aperture surface to meter the flow of fluid between apertures in the aperture surface and wherein the movable redirector support assembly is operable to move the redirector in a second direction to positions in which the metering edge of another one of the redirector cavities cooperates with the metering edges of at least two of said at least three apertures in the aperture surface to meter the flow of fluid between of apertures in the aperture surface.

* * * * *